United States Patent
Pabon et al.

(10) Patent No.: US 8,604,634 B2
(45) Date of Patent: Dec. 10, 2013

(54) ENERGY HARVESTING FROM FLOW-INDUCED VIBRATIONS

(75) Inventors: Jahir A. Pabon, Newton, MA (US); Giorgia Bettin, Lexington, MA (US)

(73) Assignee: Schlumberger Technology Corporation, Sugar Land, TX (US)

( * ) Notice: Subject to any disclaimer, the term of this patent is extended or adjusted under 35 U.S.C. 154(b) by 864 days.

(21) Appl. No.: 12/479,308

(22) Filed: Jun. 5, 2009

(65) Prior Publication Data

US 2010/0308599 A1 Dec. 9, 2010

(51) Int. Cl.
*F03B 13/00* (2006.01)

(52) U.S. Cl.
USPC ............................................ 290/54; 166/65.1

(58) Field of Classification Search
USPC ......... 290/43, 54; 166/65.1, 332.1, 334.4, 66, 166/177.6
See application file for complete search history.

(56) References Cited

U.S. PATENT DOCUMENTS

| | | | | |
|---|---|---|---|---|
| 3,970,877 | A * | 7/1976 | Russell et al. | 310/339 |
| 4,932,471 | A * | 6/1990 | Tucker et al. | 166/64 |
| 5,554,922 | A * | 9/1996 | Kunkel | 322/3 |
| 5,839,508 | A | 11/1998 | Tubel et al. | |
| 5,965,964 | A | 10/1999 | Skinner et al. | |
| 6,112,816 | A * | 9/2000 | Orzechowski et al. | 166/324 |
| 6,220,345 | B1 * | 4/2001 | Jones et al. | 166/51 |
| 6,371,210 | B1 * | 4/2002 | Bode et al. | 166/370 |
| 6,504,258 | B2 | 1/2003 | Schultz et al. | |
| 6,557,634 | B2 * | 5/2003 | Hailey et al. | 166/278 |
| 6,584,844 | B2 | 7/2003 | Beitia | |
| 6,659,186 | B2 * | 12/2003 | Patel | 166/386 |
| 6,745,844 | B2 | 6/2004 | Henderson | |
| 6,749,023 | B2 * | 6/2004 | Nguyen et al. | 166/278 |
| 6,768,214 | B2 * | 7/2004 | Schultz et al. | 290/1 R |
| 6,876,094 | B2 | 4/2005 | Jacobsen | |
| 6,984,902 | B1 | 1/2006 | Huang et al. | |
| 7,051,821 | B2 * | 5/2006 | Samuel | 175/61 |
| 7,055,598 | B2 * | 6/2006 | Ross et al. | 166/236 |
| 7,096,945 | B2 * | 8/2006 | Richards et al. | 166/276 |
| 7,116,036 | B2 | 10/2006 | Balasubramaniam et al. | |
| 7,165,608 | B2 | 1/2007 | Schultz et al. | |
| 7,191,833 | B2 * | 3/2007 | Richards | 166/278 |

(Continued)

FOREIGN PATENT DOCUMENTS

GB 2419362 A 4/2006
WO 2006085869 A1 8/2006

OTHER PUBLICATIONS

International Preliminary Report on Patentability of PCT Application Serial No. PCT/US2010/037422 dated Dec. 6, 2011.

(Continued)

*Primary Examiner* — Tulsidas C Patel
*Assistant Examiner* — Viet Nguyen
(74) *Attorney, Agent, or Firm* — Bridget Laffey; Rachel E. Greene; Jakub M. Michna (57) ABSTRACT

Electrical energy is produced at a remote site by converting kinetic energy from fluid flow to electrical energy using a downhole harvesting apparatus. The downhole harvesting apparatus includes a vibrating sleeve member that vibrates in response to fluid flow through a tubular housing structure. The vibration of the sleeve is used to generate electrical power. The harvesting apparatus may include features to help maintain constant fluid flow in the tubular structure. The harvesting apparatus can be tuned to different vibration and flow regimes in order to enhance energy conversion efficiency.

22 Claims, 9 Drawing Sheets

(56) References Cited

U.S. PATENT DOCUMENTS

| | | | |
|---|---|---|---|
| 7,199,480 B2 | 4/2007 | Fripp et al. | |
| 7,208,845 B2 | 4/2007 | Masters et al. | |
| 7,242,103 B2 * | 7/2007 | Tips | 290/1 R |
| 7,296,633 B2 * | 11/2007 | Bode et al. | 166/386 |
| 7,312,557 B2 | 12/2007 | Rastegar et al. | |
| 7,400,262 B2 | 7/2008 | Chemali et al. | |
| 7,453,163 B2 | 11/2008 | Roberts et al. | |
| 7,471,033 B2 | 12/2008 | Thiesen et al. | |
| 7,484,566 B2 * | 2/2009 | Tips et al. | 166/373 |
| 7,575,058 B2 * | 8/2009 | Franco et al. | 166/334.4 |
| 7,819,194 B2 * | 10/2010 | Tips | 166/316 |
| 2001/0040379 A1 | 11/2001 | Schultz et al. | |
| 2006/0086498 A1 | 4/2006 | Wetzel et al. | |
| 2010/0194117 A1 * | 8/2010 | Pabon et al. | 290/1 R |

OTHER PUBLICATIONS

Sari et al., "An electromagnetic micro power generator for wideband environmental vibrations," Sensors and Actuators A, 2008, vol. 145-146: pp. 405-413.

\* cited by examiner

ENERGY HARVESTING FROM FLOW-INDUCED VIBRATIONS

FIELD OF THE INVENTION

This invention is generally related to harvesting energy and more particularly to converting kinetic energy from a flowing fluid into electrical energy to power equipment.

BACKGROUND OF THE INVENTION

In order to recover natural resources from subterranean formations it is often necessary to perform tasks related to exploration, monitoring, maintenance and construction in remote locations that are either difficult or impractical for personnel to reach directly. For example, boreholes may be drilled tens of thousands of meters into the earth, and in the case of offshore drilling the borehole may be thousands of meters under water. One of the technical challenges to performing tasks in such remote locations is providing power to equipment. It is known to power downhole and undersea equipment via either stored energy or wireline connection to the surface. However, both of these techniques have disadvantages. For example, a wireline connection to the surface limits that distance at which the equipment can operate relative to the energy source, and may require a relatively significant portion of the limited volume of a borehole; and in many situations running a wireline is not even possible. Using stored energy avoids some of the disadvantages of a wireline connection to the surface, but relatively little energy can be stored in comparison to requirements because of size limitations. For example, the available volume in a borehole environment is relatively small for a battery having a relatively large storage capacity. Further, both wireline connection to the surface and stored energy techniques require the presence of operators, e.g., a surface vessel to either provide the wireline energy or recharge the energy storage means. Therefore, it would be beneficial to be able to generate electrical power in a remote location, e.g., in relatively close proximity to a well tool which consumes the electrical power without the need for physical connection with the surface or retrieval for recharge.

Various techniques are known for converting the kinetic energy associated with flowing fluid into electrical energy. U.S. Pat. No. 6,504,258 describes a downhole power generator which produces electrical power from vibrations in response to fluid flow. One limitation of this design is that the flow rate is greatly affected by the energy harvesting function. It is accordingly an object of the present invention to provide a method and an apparatus to harvest kinetic energy from fluid flow with minimal interference with fluid flow.

SUMMARY OF THE INVENTION

In accordance with one embodiment of the invention, an apparatus for converting kinetic energy from fluid flow to electrical energy comprises a housing with at least two openings through which fluid is permitted to traverse; a vibrating sleeve operatively connected on the outside of the housing; the vibrating sleeve containing at least two sleeve openings; and the vibrating sleeve characterized by mechanical properties that permit the vibrating sleeve to oscillate and a device that converts sleeve oscillation to electrical energy.

In accordance with another embodiment of the invention, a method for converting kinetic energy to electrical energy, the method comprising the steps of flowing fluid in a first direction through the at least two openings of a tubular housing, vibrating a sleeve operatively connected on the housing in response to the flowing fluid through the at least two sleeve openings; and generating electrical energy in response to the vibrating sleeve moving in an oscillatory manner.

In accordance with another embodiment of the invention, an apparatus for converting kinetic energy to electrical energy comprises a housing having a first axial flow passage formed therethrough; a vortex shedding sleeve located on the end of the housing; the vortex shedding sleeve characterized by mechanical properties that permit the vortex shedding sleeve to oscillate; and a device that converts vortex shedding sleeve oscillations to electrical energy.

One advantage of the invention is that electrical energy can be produced in a remote environment. The energy harvesting device does not rely on a physical connection with a device at the surface for power. Further, because the source of kinetic energy is not dependent on a limited reservoir of fuel or battery power, the device can produce electrical energy continuously. A further advantage of the invention is that the fluid flow in the tubing remains nearly constant.

Further features and advantages of the invention will become more readily apparent from the following detailed description when taken in conjunction with the accompanying drawings.

DETAILED DESCRIPTION

The particulars described herein are by way of example for purposes of discussion of the illustrated embodiments of the present invention in order to provide what is believed to be a useful and readily understood description of the principles and conceptual aspects of the invention. No attempt is made to show structural aspects of the invention in more detail than is necessary for a fundamental understanding of the invention.

The invention may be implemented in various different embodiments of a device for converting external stimuli in the form of kinetic energy from the surrounding environment into electrical energy. The embodiments are described below in the context of the source of kinetic energy being vibrations caused by normal operations associated with creation and production of a petrochemical recovery well, fluid flow through a borehole, or both. However, the invention is not limited to petrochemical wells. The apparatus and method is described as being performed with a producing well in which fluid is produced from a formation into a tubular string and is then flowed through the tubular string to the earth's surface.

Figure 1:
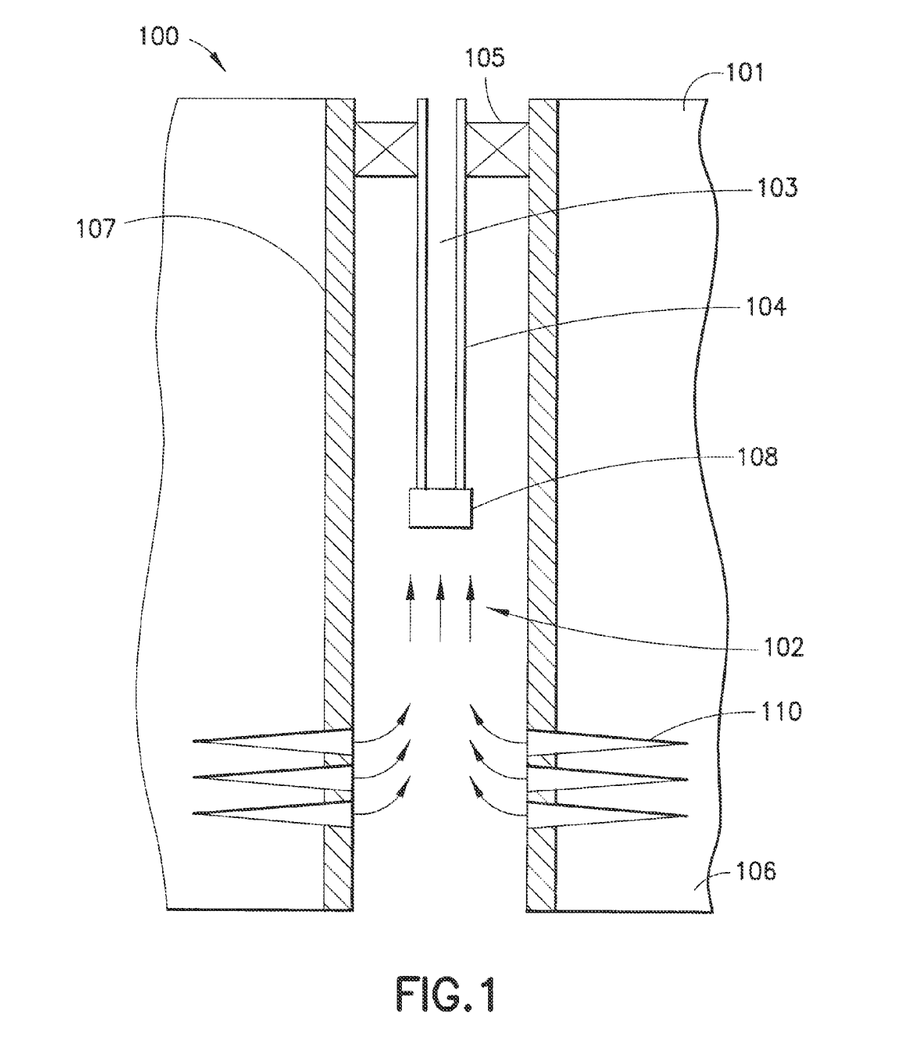
FIG. 1 illustrates an energy harvesting device located on the end of a production tubing.

FIG. 1 illustrates a downhole energy harvester system (100) which embodies principles of the present invention. In the illustrated embodiment (101), a well includes a tubular string (104) (such as a production, injection, drill, test or coiled tubing string) that extends into a wellbore of the well (101). The tubular string may include a central passageway (103) that communicates a flow (102) from a subterranean formation zone (106) (or to a formation zone in the case of an injection well). The wellbore (101) includes perforations (110) which allow access to the subterranean formation zone (106) through the casing (107). The zone (106) may be defined (i.e., isolated from other zones) by one or more packers (105). Fluid flow (102) is a primary source of vibrational energy downhole, and this vibrational energy is captured by a vibrational energy harvesting mechanism (108) for purposes of converting the vibrational energy into downhole electrical power.

During oil recovery operations fluid flows through production tubing and, in many instances, this creates structural vibrations due to flow instabilities. These structural vibrations can be an important source of harvestable energy for downhole power. The very end of the production tubing is, in many cases, an aspirating cantilever type geometry. The packers as in FIG. 1 hold the tubing anchored to the casing, creating a cantilever that is free to vibrate. As fluid flows into the tubing, an instability is created, which drives the cantilever to vibrate at a certain frequency. Therefore, an optimal position for an energy harvester would be very close to the tip where the amplitude of vibrations is the greatest.

An energy harvester (108) is located at the end of the tubular string (104) in the present embodiment. The energy harvester (108) harvests kinetic energy from fluid flow (represented by arrows (102)). During production of a well there is a constant outflow of oil upstream through the tubular string (104) and this fluid flow provides a large amount of kinetic energy. This kinetic energy can be harvested to provide electrical power downhole. The device (108) functions to convert the kinetic energy of a fluid flow 102 in the well 101 into electrical energy. In particular, the energy conversion is made from the hydraulic domain to the electrical domain by means of first converting fluid flow into vibrations, and then converting the vibrations into electrical energy. In the illustrated embodiment, fluid flows through a cylindrical (tubular) housing having an inlet and outlet. Kinetic energy associated with the fluid flow is converted to mechanical energy in the form of vibrations. Various techniques are known in the art for converting fluid flow into vibrations, and any of those techniques might be utilized depending on the desired characteristics for a particular purpose. The present invention is concerned with converting the vibrations to electrical energy. In particular, the invention concerns a vibrating device which keeps the flow rate nearly constant and prevents flow pulsations. These flow pulsations can be dangerous for any mechanical device located along the tubing. The energy harvester (108) is located at the end of the tubular string (104) and therefore is minimally interfering with the fluid flow in the tubing. The kinetic energy generated is not as a result of the opening and closing of any type of inlet for fluid flow.

A variety of methods may be used to produce electrical power from the vibration of the vibrating sleeve, including a coil and magnet, with relative displacement being produced between the coil and the magnet as the member vibrates. The energy harvesting device may include a piezoelectric material and a mass, with the mass bearing on the piezoelectric material and inducing strain as the member vibrates. It could also include a piezoelectric material as part of the vibrating sleeve so that strain is induced in the piezoelectric material as the member flexes when it vibrates. The electrical power may then be used to power one or more downhole power consuming-components, such as actuators, sensors, etc.

Figure 2:
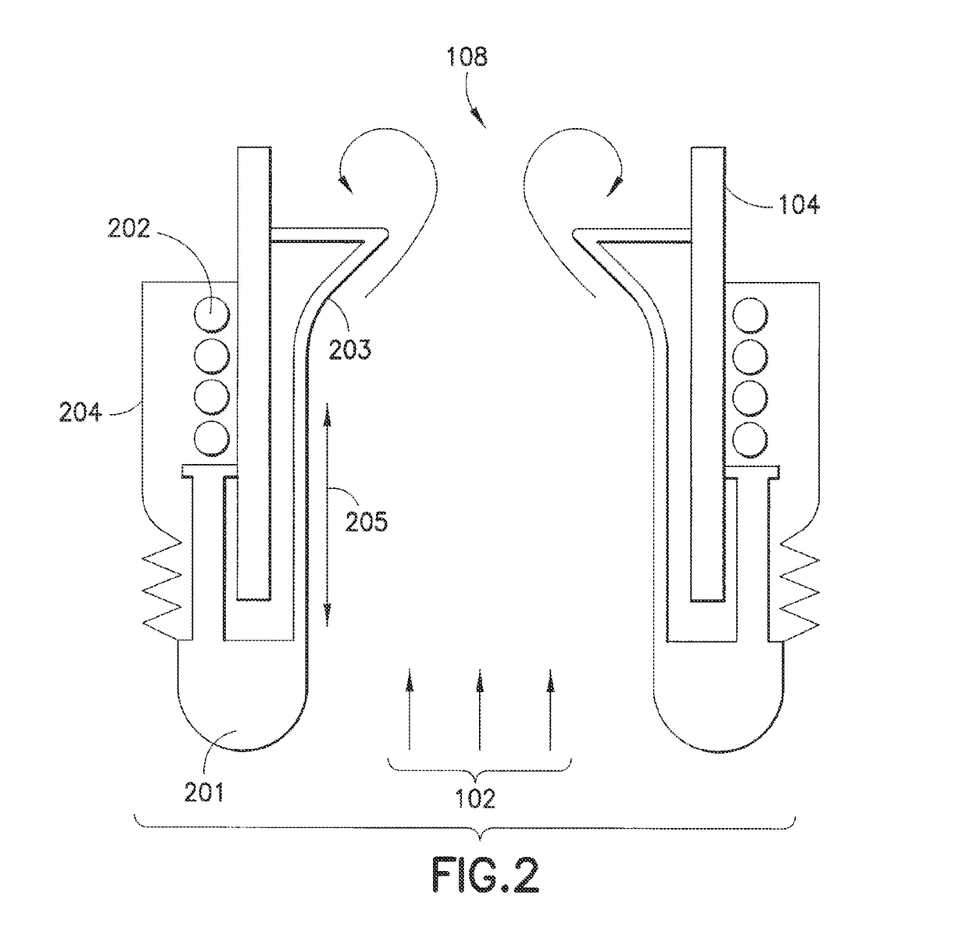
FIG. 2 illustrates an embodiment of the energy harvesting device of FIG. 1.

FIG. 2 shows an energy harvesting device (108) for converting kinetic energy associated with fluid flow into electrical energy for use in accordance with an embodiment of the present invention. The energy harvesting device (108) uses a spring (202) and a mass (201) mounted on the end of the tubular string (104). The mass (201) is attached to a vortex shedding device (203) extending into a flow passage which is positioned perpendicular to fluid flow (102). This vortex shedding device (203) provides a forcing that can be excited by turbulence in the flow and/or by vortexes shedding. This forcing will displace the mass (201) in an axial direction (205) which in turn compresses the spring (202) with the potential energy being stored in the spring (202). The energy is then harvested from the vibrating mass-spring system using certain mechanical to electrical generator systems. The frequency of oscillations of this energy harvester (108) can be tuned by varying the mass and/or spring constant. To enhance energy harvesting the frequency of oscillation may be selected to tune the energy harvesting device (108) to the source of vibrations.

Figure 3A:
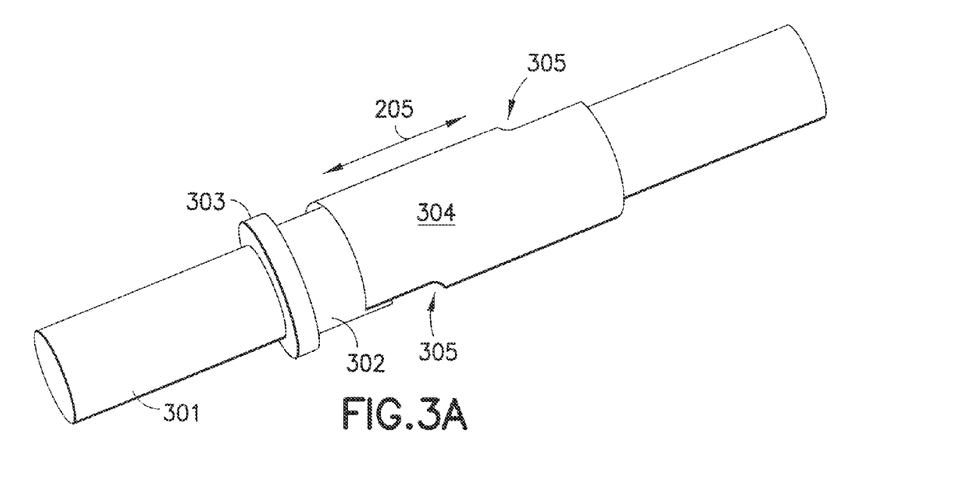
FIGS. 3A and 3B illustrates an alternative embodiment of the energy harvesting device.
Figure 3B:
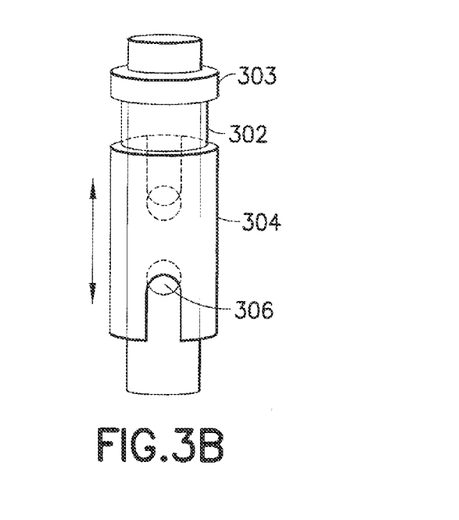

FIGS. 3A and 3B illustrates a further embodiment of an energy harvesting device (108). The embodiment is mounted on the exterior of a tubular string (301) and consists of a vibrating sleeve member (304), a spring member (302) and a stopper member (303). The vibrating sleeve member (304) has two or more sleeve openings (305). The present embodiment has two sleeve openings (305) which are located at 180° from each other and are located at opposite ends of the vibrating sleeve member (304). The sleeve openings (305) are aligned with two or more openings through the tubular string (306) as depicted in FIG. 3B. The sleeve openings (305) are circular but other shapes would serve the same purpose and the present embodiment is not restricted to circular shapes. The vibrating sleeve member (304) is attached to a spring member (302) and a stopper (303). The stopper (303) serves to attach the vibrating sleeve member (304) and the spring member (302) to the tubular string (301) and also to support the spring member (302). The vibrating sleeve member (304) has flow passages formed through it. The vibrating sleeve member (304) and stopper (303) can be made from any metals/alloys for example steel or aluminum but are not limited to these materials. The material density can be changed or tuned to match a target weight in order to produce the desired system response, such as the amplitude and natural frequency of the motion. The energy harvesting device is anchored to the tubular string (301) in the following manner: the stopper (303) is anchored to the tubular string (301) and to a first end of the spring member (302). The second end of the spring member (302) is attached to the vibrating sleeve member (304) and this anchors the energy harvesting device in place.

Figure 4:
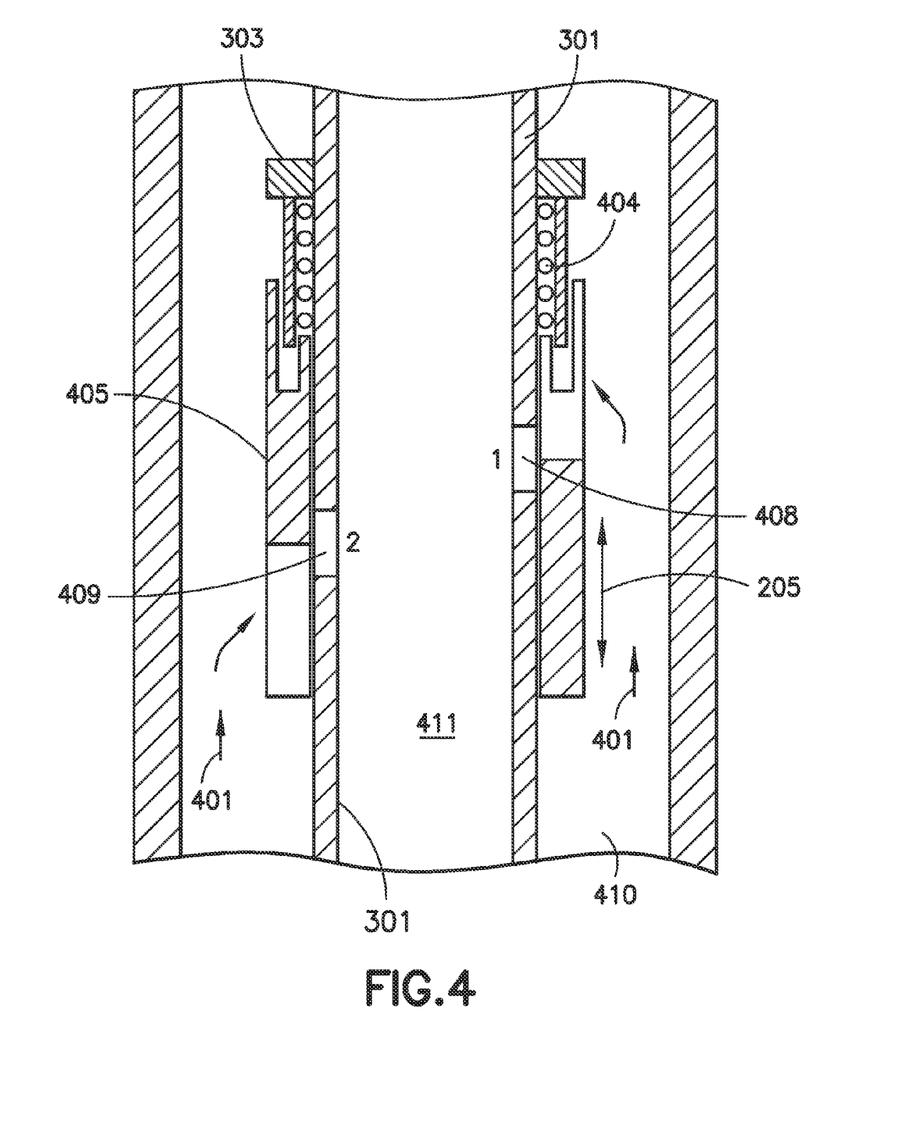
FIG. 4 illustrates a cross-sectional view of the vibrating sleeve with two offset openings.

Referring to FIG. 4 a cross-section of the embodiment of FIGS. 3A and 3B is depicted. As the fluid (401) flows from the external region (410) into the internal region (411) of the tubular string (301) it will cause the vibrating sleeve member (405) to vibrate in an axial direction (205). The vibrating sleeve member (405) is positioned so that at equilibrium 50% of each of the sleeve openings (408) and (409) are shielded. Fluid flow (401) enters the tubular string (301) through the sleeve openings (408) and (409). As fluid flows through the sleeve openings (408) and (409) the vibrating sleeve member (405) vibrates as the pressure exerted by the fluid moving from the annulus into the tubular string (301) is greater than the spring (404) reaction force. As the vibrating sleeve member (405) moves upward as depicted in FIG. 4 the opening marked 1 (408) in FIG. 4 is obstructed, therefore, reducing the flow rate through that opening. On the other hand the flow through the opening marked 2 (409) is increased, since more area is exposed, and the total flow rate through the tubing is nearly constant. As the sleeve keeps moving upward the force on the sleeve decreases below the spring reaction force and the sleeve will change direction. As the sleeve moves downward the process is repeated in the opposite direction. This instability allows for sustained axial oscillations of the sleeve. The total flow rate into the tubular string (301) remains nearly constant because as the opening marked 1 (408) closes the opening marked 2 (409) opens which ensure the same amount of area is always exposed thus keeping the flow of fluid through the tubular string (301) nearly constant. Aligning the sleeve openings (405) and (408) ensures that the flow rate in the tubular string (301) remains nearly constant. By choosing the right combination of sleeve weight and spring stiffness the oscillation frequency of the sleeve can be controlled while the oscillations amplitudes are set by the natural pressure difference between the environment downhole and upstream.

Figure 5:
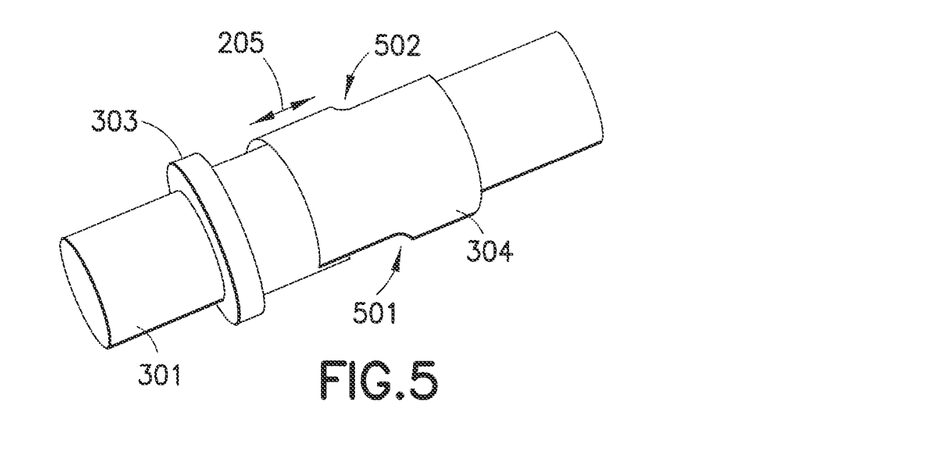
FIG. 5 illustrates orientation of the energy harvesting device of FIG. 3 with two aligned openings.

Referring to FIG. 5 the sleeve openings (501) and (502) are aligned. The arrangement of the sleeve openings in this embodiment is aimed at enhancing lateral vibrations. The lateral vibrations are generated because as the vibrating sleeve oscillates different amount of fluid flow enters into each sleeve opening causing the tubular string (301) itself to laterally vibrate. Energy can also be harvested from the lateral vibrations of the tubular string (301) by using the energy harvesting techniques disclosed in a previously filed application U.S. Ser. No. 12/366,119, filed Feb. 3, 2009, the contents of which are hereby incorporated by reference.

Figure 6:
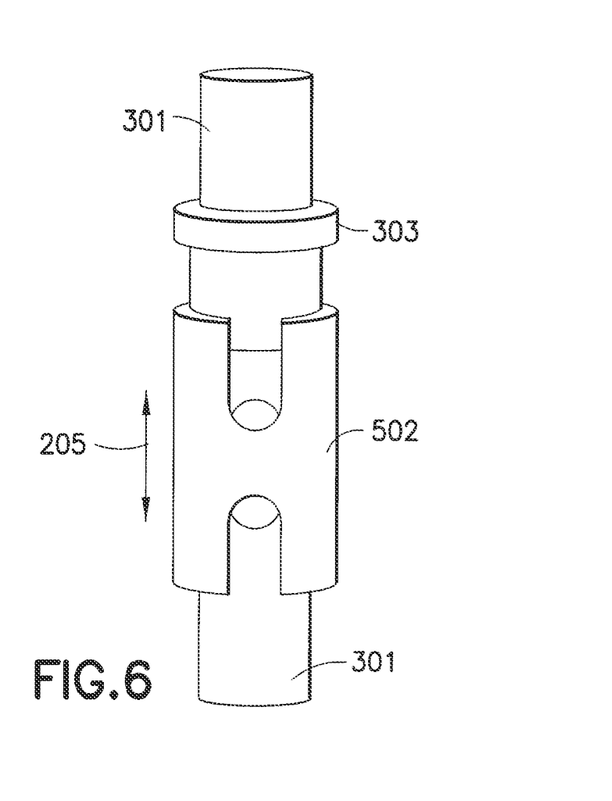
FIG. 6 illustrates orientation of the energy harvesting device of FIG. 3 with two openings on one side.
Figure 7:
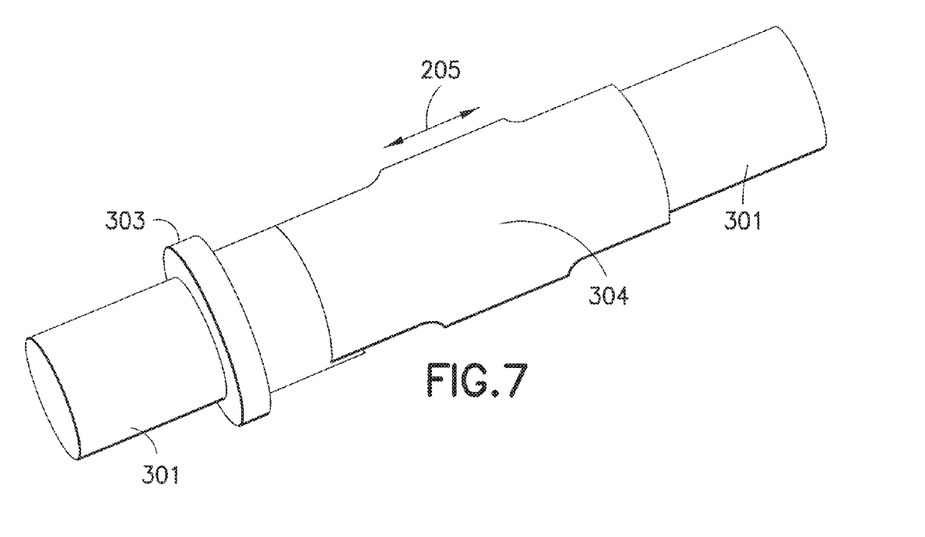
FIG. 7 illustrates orientation of the energy harvesting device of FIG. 3 with four openings, two per side.

FIG. 6 and FIG. 7 depict different orientations of the sleeve openings. FIG. 6 depicts the vibrating sleeve with two sleeve openings on one side. This configuration will reduce lateral vibrations if desired. Alternatively FIG. 7 depicts the vibrating sleeve with two sleeve openings per side. The orientation of the sleeve openings in FIG. 7 would yield vibrations only in the axial direction as the geometry is symmetrical.

Figure 8:
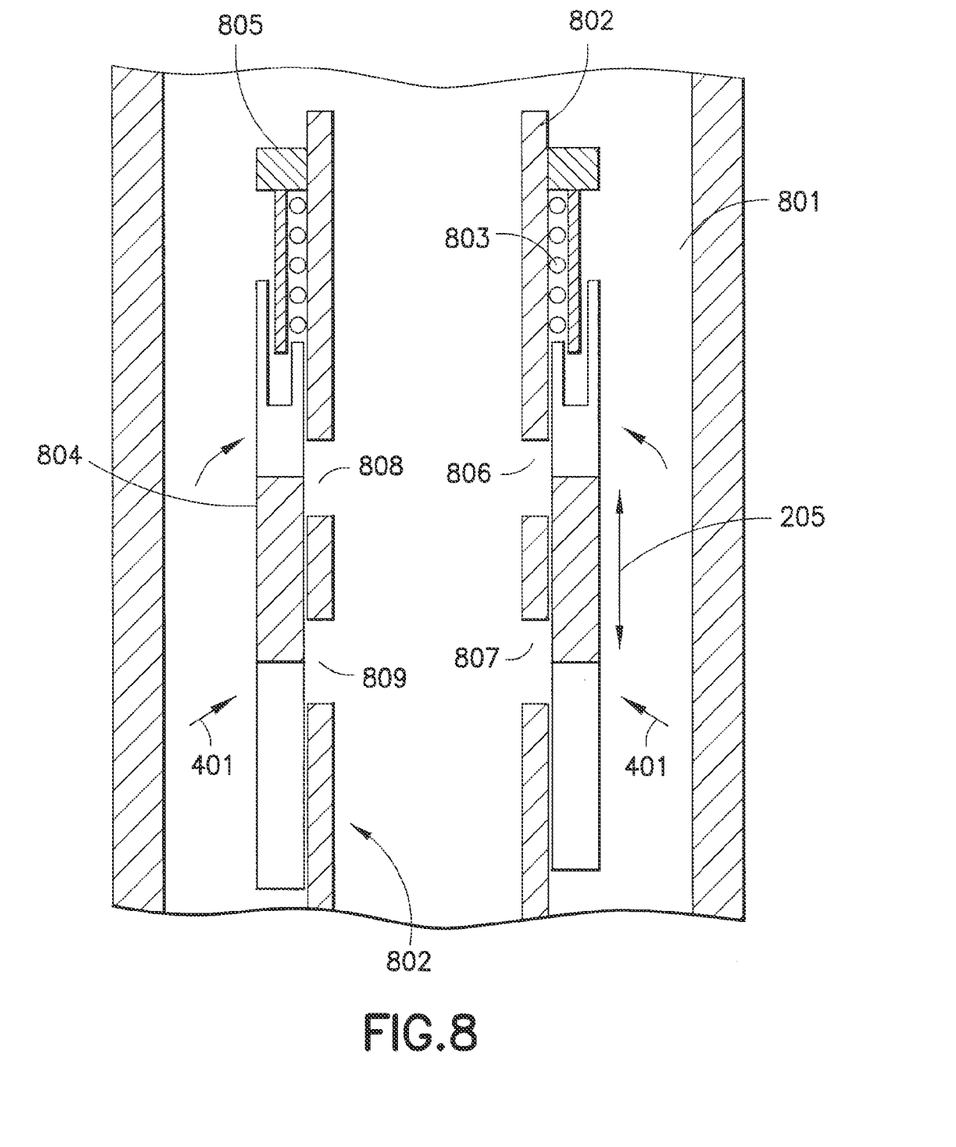
FIG. 8 illustrates a cross-sectional view of the vibrating sleeve of FIG. 3 with four openings, two per side.

FIG. 8 depicts a cross-section of FIG. 7 where the vibrating sleeve has four sleeve openings, two per side. Vibrating sleeve member (804) has sleeve openings (806) and (807) on one side of the sleeve and sleeve openings (808) and (809) on the opposite side of the sleeve. The vibrating sleeve (804) is positioned so that at equilibrium 50% of each of the sleeve openings is shielded. As fluid flows through the sleeve openings it will cause axial oscillations of the sleeve. This total flow rate into the tubing remains nearly constant because as the openings marked (806) and (808) closes the opening marked (807) and (809) opens which ensure the same amount of area is always exposed thus keeping the flow of fluid through the tubular string (802) nearly unchanged.

Figure 9A:
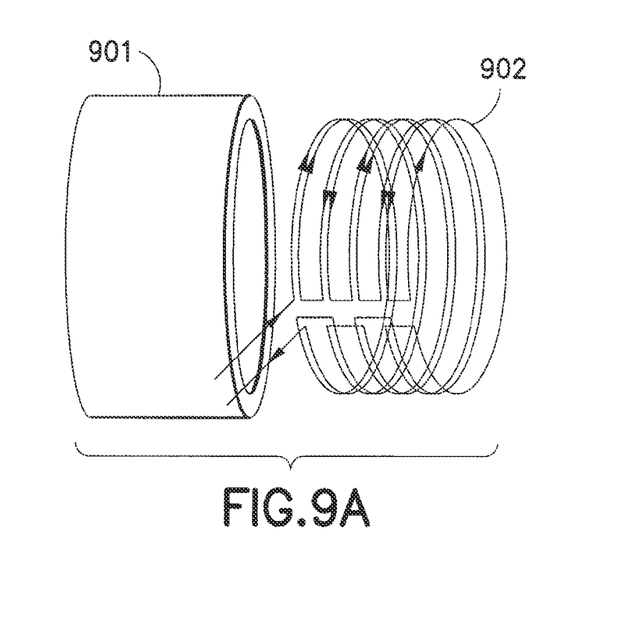
FIGS. 9A and 9B illustrates the energy harvesting of FIG. 1 with a series of alternating magnets.
Figure 9B:
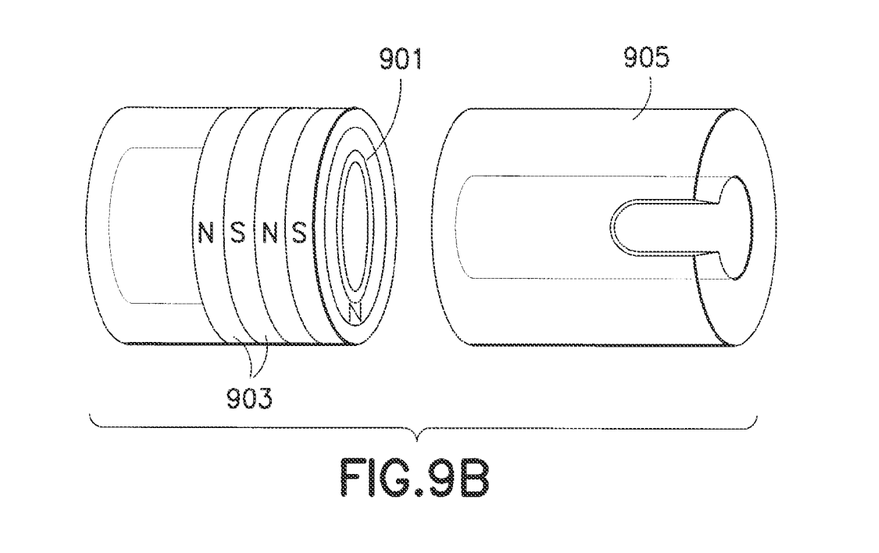

FIGS. 9A and 9B illustrates the energy harvesting device with a series of alternating magnets. The vibrating sleeve member (905) is characterized by a plurality of stacked annular magnets (903), each of which is radially polarized. In particular, the radial polarization of adjacent magnets in the stack is alternated. The coils (902) are wound in partial wraps around the magnets, and disposed so as to enhance or even maximize the magnetic flux changes as the magnets move along an axis defined by the vibrating sleeve member (905). Cylindrical magnetically permeable backing plate (901) is disposed around the coils and the stacked cylindrical magnets, respectively. The specifics of the magnets and coil design have been previously disclosed in U.S. Ser. No. 12/366,119, filed Feb. 3, 2009, the contents of which is hereby incorporated by reference. A spring is selected to achieve a desired resonant frequency.

Figure 10:
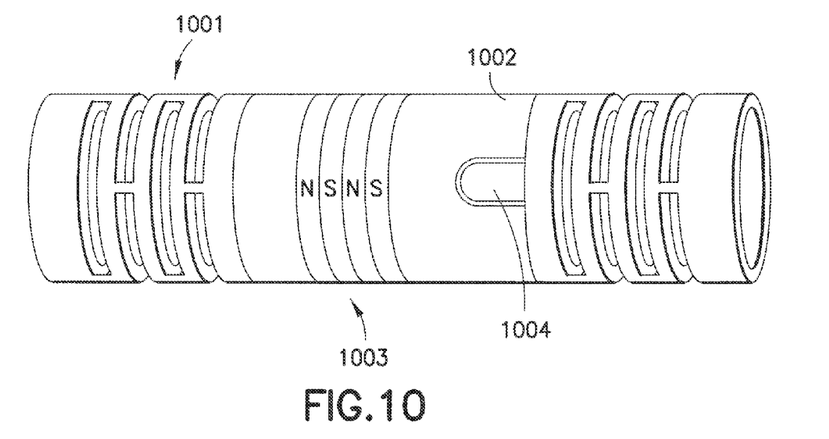
FIG. 10 illustrates the embodiments of FIGS. 9A and 9B with cylindrical flexures.

Representatively illustrated in FIG. 10 the spring is embodied as cylindrical flexures (1001). The vibrating sleeve member (1002) is attached on both sides to the cylindrical flexures (1001) and anchored to the tubular string. The vibrating sleeve member (1002) contains the plurality of stacked annular magnets (1003) as described in FIG. 9A and 9B. The flexures (1001) can perform the dual functionality of providing spring force and constraining movement in undesired directions e.g. up and down in the present embodiment. These flexures are compact structures constructed from a network of interconnected beams which are usually arranged in a zig-zag pattern. The flexures (1001) can be designed to have an appropriate axial spring constant to achieve a desired resonant behavior, while being appreciably more rigid along the lateral direction so as to allow the vibrating sleeve to essentially float around the tubing and eliminate the need for bearings. These flexures mitigate out of plane movement of the magnets.

Figure 11:
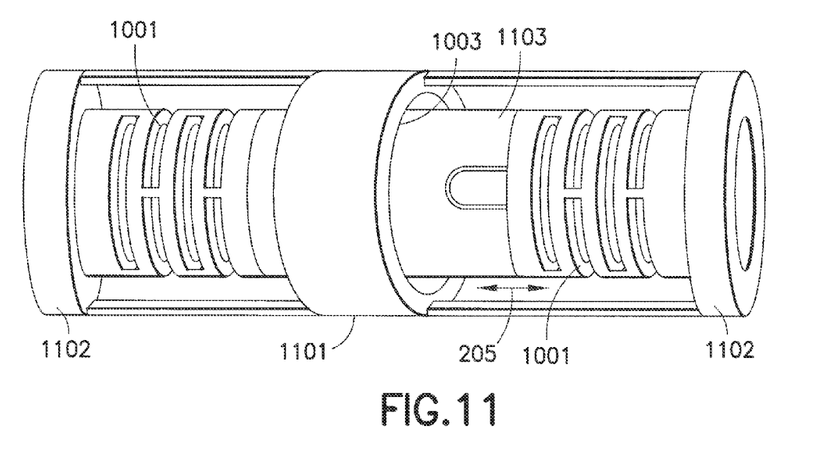
FIG. 11 illustrates the embodiment of FIGS. 9A and 9B with a vibrating sleeve which moves relative to stationery coils.

FIG. 11 illustrates the energy harvesting device with a set of stationary coils attached to a cylindrical magnetically permeable backing plate (1101) which are placed around the vibrating sleeve member (1103) and are kept static by attaching the cylindrical magnetically permeable backing plate (1101) to the anchoring rings (1102) as shown in FIG. 11. As the flow instability is excited the vibrating sleeve member (1103) will vibrate creating relative motion between the magnets on the sleeve and the coils which will induce an electric current.

It should be noted that the application of any of the various embodiments of the invention described above is not limited to the production phase of natural resource recovery operations. For example, a significant amount of fluid energy is available during fracturing operations, and a similar device may be used for distributed sensor networks or other applications requiring energy downhole, based on the energy harvesting principles described above. Another possible application is to use this Energy Harvester inside an oil/gas pipeline. Another application outside the oil industry could be placing these devices along currents in rivers, water pipelines, sewers, wind passages, and any other flow that can induce vibrations and therefore shaking the module that transforms kinetic energy into electric one.

While the invention is described through the above exemplary embodiments, it will be understood by those of ordinary skill in the art that modification to and variation of the illustrated embodiments may be made without departing from the inventive concepts herein disclosed. Moreover, while the preferred embodiments are described in connection with various illustrative structures, one skilled in the art will recognize that the system may be embodied using a variety of specific structures. Accordingly, the invention should not be viewed as limited except by the scope and spirit of the appended claims.

What is claimed is:

1. An apparatus for converting kinetic energy to electrical energy comprising:
   a housing with at least two openings through which fluid is permitted to traverse;
   a vibrating sleeve operatively connected on the outside of the housing;
   the vibrating sleeve comprising at least two sleeve openings configured to align with the at least two openings;

the vibrating sleeve characterized by mechanical properties that permit the vibrating sleeve to oscillate, the oscillations of the vibrating sleeve simultaneously opening one of the at least two openings and closing one of the at least two openings, resulting in a nearly constant fluid flow into the housing;

a device that converts sleeve oscillations to electrical energy; and wherein at rest about 50% of the at least two openings are blocked by the at least two sleeve openings.

2. The apparatus of claim 1 wherein sleeve oscillations are generated in response to fluid flow.

3. The apparatus of claim 1 wherein sleeve oscillations are generated in response to vortex shedding from a vortex shedding device.

4. The apparatus of claim 1 wherein sleeve oscillations are axial oscillations.

5. The apparatus of claim 1 wherein sleeve oscillations are lateral oscillations.

6. The apparatus of claim 1 wherein the at least two openings are circular.

7. The apparatus of claim 1 wherein the at least two sleeve openings are offset on opposite sides of the vibrating sleeve.

8. The apparatus of claim 1 wherein the at least two sleeve openings are aligned on the same side of the vibrating sleeve.

9. The apparatus of claim 1 further including at least one spring member that controls the range of relative motion and defines a resonant frequency of the apparatus.

10. The apparatus of claim 9 wherein the spring member includes a flexure.

11. The apparatus of claim 1 wherein the vibrating sleeve moves in response to natural flow fluctuations.

12. The apparatus of claim 1 wherein the housing is a segment of production tubing.

13. The apparatus of claim 1 further comprising:
at least one coil attached to at least one backing plate; and
the vibrating sleeve member comprising a plurality of stacked annular magnets arranged with respect to the at least one coil such that magnetic flux from the magnets induces an electric current through the coil in response to relative motion between the magnets and at least one coil.

14. The apparatus of claim 13 wherein the at least one backing plate is placed around the vibrating sleeve.

15. The apparatus of claim 13 wherein the at least one backing plate is attached to an anchoring ring.

16. The apparatus of claim 13 wherein the vibrating sleeve moves relative to the at least one coil which is stationary.

17. The apparatus of claim 1 wherein the vibrating sleeve weight corresponds to a predetermined natural frequency.

18. A method for converting kinetic energy to electrical energy, the method comprising the steps of:
flowing fluid in a first direction through at least two openings of a housing;
vibrating a sleeve operatively connected on the housing in response to the flowing fluid through at least two sleeve openings which are configured to align with the at least two openings;
generating electrical energy in response to the vibrating sleeve moving in an oscillatory manner; and
wherein at rest about 50% of the at least two openings are blocked by the at least two sleeve openings, the movement of the vibrating sleeve simultaneously opening one of the at least two openings and closing one of the at least two openings, resulting in a nearly constant fluid flow into the housing.

19. The method of claim 18 further including a step of generating oscillatory movement of the vibrating sleeve in response to the fluid flow.

20. The method of claim 18 further including a step of generating oscillatory movement of the vibrating sleeve in response to vortex shedding of a vortex shedding device.

21. The method of claim 18, further including a step of controlling a range of relative motion with a spring and defining a resonant frequency with the spring.

22. The method of claim 18, further comprising moving the vibrating sleeve in response to natural flow fluctuations.

* * * * *